No. 735,644. PATENTED AUG. 4, 1903.
E. WIRTZ.
SHEET METAL CLAMPING BAND WITH INCLINED LOOSE DISPLACEABLE
JOINT FOR PIPE UNIONS.
APPLICATION FILED OCT. 27, 1902.
NO MODEL.
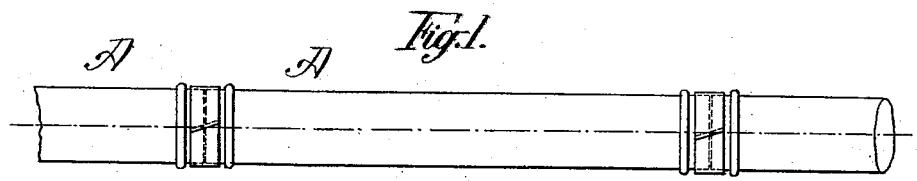
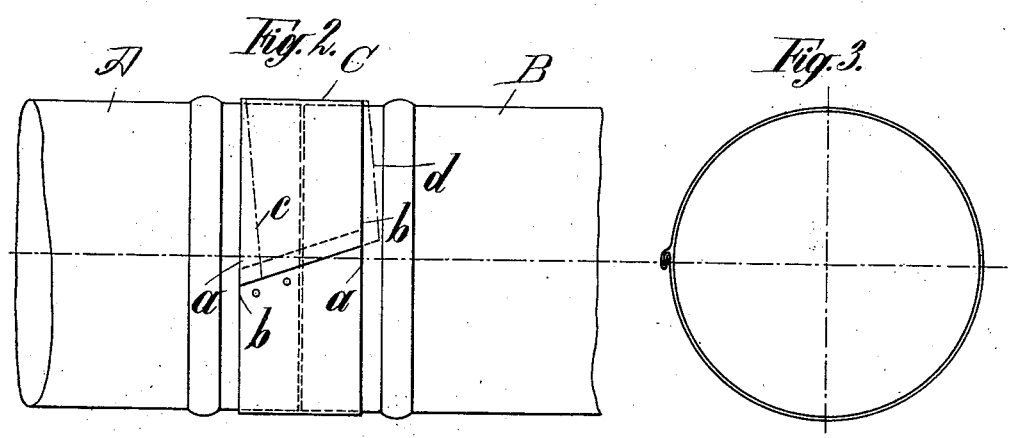 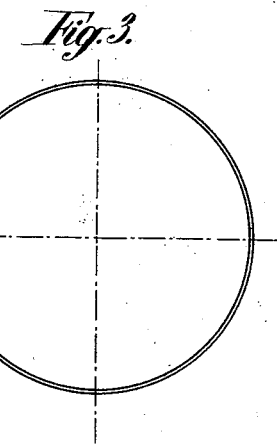
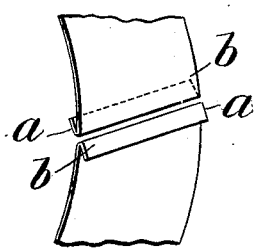
WITNESSES:
W. M. Avery
R. B. Cavanagh
INVENTOR
Edward Wirtz,
BY
Munn
ATTORNEYS.

No. 735,644. Patented August 4, 1903.

UNITED STATES PATENT OFFICE.

EDUARD WIRTZ, OF SCHALKE, GERMANY.

SHEET-METAL CLAMPING-BAND WITH INCLINED LOOSE DISPLACEABLE JOINT FOR PIPE-UNIONS.

SPECIFICATION forming part of Letters Patent No. 735,644, dated August 4, 1903.

Application filed October 27, 1902. Serial No. 128,953. (No model.)

*To all whom it may concern:*

Be it known that I, EDUARD WIRTZ, manufacturer, a subject of the King of Prussia, German Emperor, residing in Schalke, in the Kingdom of Prussia, Province of Westphalia, German Empire, have invented a certain new and useful Sheet-Metal Clamping-Band with Inclined Loose Displaceable Joint for Pipe-Unions, of which the following is a specification.

This invention relates to certain novel and useful improvements in a simple device for uniting cylindrical pipes, and in particular to thin-walled pipes with butt-joints—such as are used, for instance, for air-conduits in mines and for other purposes.

One of the objects of my invention is to provide a clamping-band for pipes or the like which shall be exceedingly simple, may be readily placed in position, and one which can be manufactured in great quantities at comparatively little expense.

In British Patent No. 18,666 of 1900 a union for thin-walled pipes—such as air-conduits, gas-conduit pipes, and the like—has been described, such a union consisting of two semicircular and wedge-shaped collars, the ends of which are formed with interlocking hooks, which bands when being forced against each other become securely attached to the pipes that it is desired to unite by reason of their wedge shape. The peculiar shape of these two collars requires them to be of relatively great thickness, so that they will protrude or project a considerable distance beyond the outside of the pipes which are to be joined. My invention differs from devices of this kind by the simplicity of its construction, and particularly do I avoid any protrusion or projection of the parts.

My invention consists in the construction, combination, and arrangement of parts, as is herein described in this specification, delineated in the accompanying drawings, and set forth in the appended claims.

Reference is to be had to the accompanying drawings, forming a part of this specification, in which similar characters of reference indicate corresponding parts in all the figures.

Figure 1 is a view of a pipe or conduit having my improved clamping-band applied thereto. Fig. 2 is an enlarged view showing the band in its closed position, the open position of said band being shown in the dotted lines *c* and *d*. Fig. 3 is a view taken transversely through a conduit, the band being shown as applied or clamped thereon. Fig. 4 is a detail view of the joint of the clamping-band.

In my invention the union is not affected in the same manner as in the British patent referred to, but I make use of the clamping-band made or constructed of a single strip, which after being mounted on the pipes to be jointed will project or protrude only to a slight extent. In its detached non-clamping position this band has the appearance of a sheet-metal strip, both ends of which are beveled or cut off obliquely, but parallel to each other, the inclined edges being bent over in hook form in opposite or reverse directions.

In the closed position of the clamping-band these hook-shaped inclined edges are in engagement with each other and form a single-flanged joint inclined to the axis of the tube, as will be seen in Fig. 2. This tube is not yet drawn tight, but remains in a loose condition, so as to permit the engaging edges of the band to be laterally displaceable toward each other by reason of the flexibility of the band. The inclined or beveled shape of the joining edges renders it possible to increase or diminish the diameter of the band by merely moving the heads or hook portions thereof toward each other. For instance, in the drawings the pipe-sections A and B are presumed to have been placed in a position of contiguity ready to be joined. The band or strip C is then placed around the same, and if the longer ends *a a* are moved toward each other the diameter of the band is increased, while upon moving the shorter ends *b b* toward each other the diameter is decreased or diminished. In the latter case the band will be tightly clamped around the pipe ends, so as to produce a firm union of the same; and to further strengthen or secure the joint any packing material may be inserted.

The band may be loose—that is to say, separate from the pipe entirely—or one end of it may be riveted to the pipe end. In the latter case the loose end of the band is driven out by a blow of a hammer. When the device is made use of, this causes an increase of diameter, as described, and both pipe ends which are to be united are then moved toward each other, and the projecting part of the band is then driven backward until such band has been tightly clamped around the pipe ends. The band may also be secured to the inside of the pipe-walls, in which case the flange-joint is running in the reverse direction, the band becoming securely attached to the inside walls upon moving the pipes toward each other.

The pipe-union herein described is particularly distinguished by its great simplicity, it being merely necessary to clamp the band around the pipe-bands when the joints are forced together, thereby obviating the use of all supplemental means, such as wedges, screws, levers, and the like. The band is also particularly adapted for use as a collar and may be employed for sewer-pipes or vertically-arranged waste-pipes in the place of pipe-hooks and the like.

While I have herein mentioned my improvement as applied particularly to pipe-unions, it will of course be understood that it may be applied in numerous and various ways. For instance, it will be found extremely convenient and applicable as a substitute for barrel-hoops and may also be employed as a clamp for uniting sheet-metal collars for pipe-insulating covering and the like.

Having thus described my invention, I claim as new and desire to secure by Letters Patent—

1. A clamping-band comprising a strip of flexible material, and inclined oppositely-turned, relatively parallel hooks formed on said band.

2. A clamping-band formed of a single strip of sheet metal having the ends thereof beveled or inclined, and oppositely-turned hooks formed on said inclined end portions adapted to interlock when the band is in its clamping position, substantially as specified.

3. A clamping-band comprising a strip of flexible material, having the ends thereof beveled or inclined, and oppositely-turned parallel hooks formed on said inclined portions, said hooks being adapted to form a lateral displaceable joint whereby to permit the band to be secured or released upon moving the ends.

In witness whereof I have hereunto signed my name in the presence of two subscribing witnesses.

EDUARD WIRTZ.

Witnesses:
   PETER LIEBER,
   WILLIAM ESSENWEIN.